Figure 1:
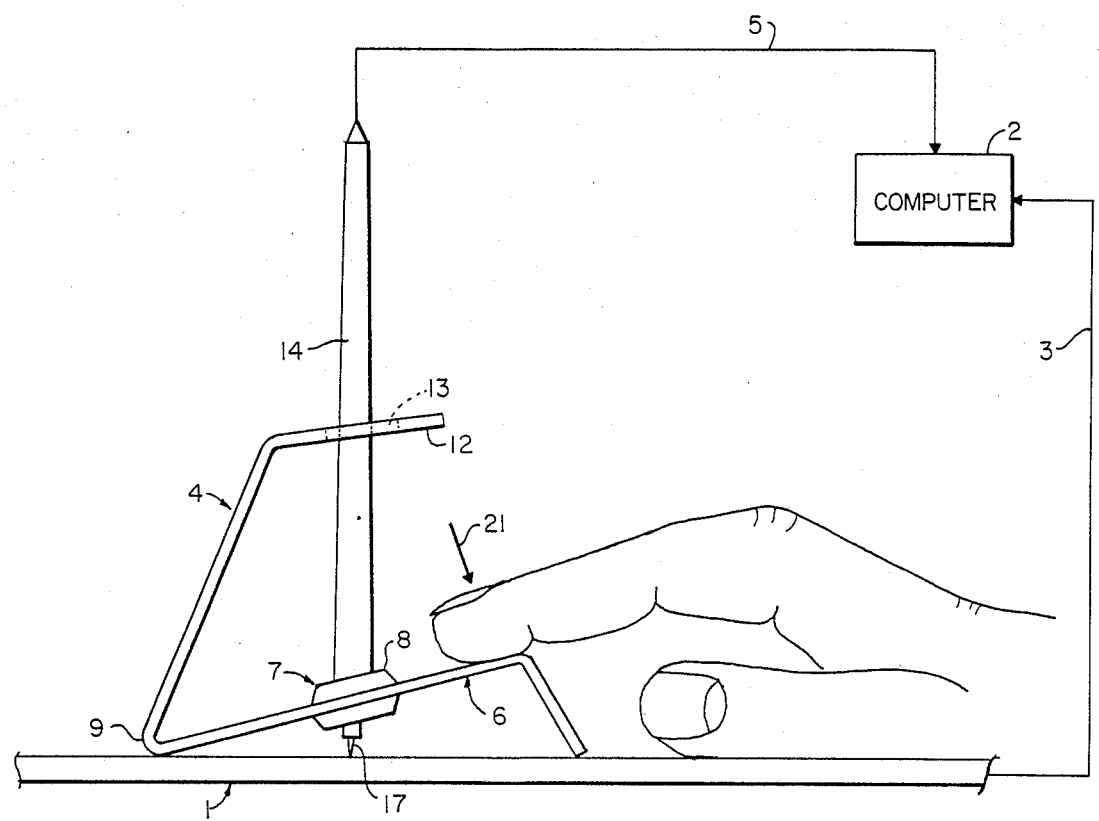

United States Patent [19]

Santoro

[11] Patent Number: 4,791,249

[45] Date of Patent: Dec. 13, 1988

[54] DIGITIZER PEN CADDY

[76] Inventor: Eugene A. Santoro, 14 Peach Orchard Rd., Burlington, Mass. 01803

[21] Appl. No.: 858,642

[22] Filed: May 2, 1986

[51] Int. Cl.[4] .............................................. G08C 21/00
[52] U.S. Cl. ........................................ 178/18; 15/437
[58] Field of Search ............... 178/18, 19, 20; 15/435, 15/437

[56] References Cited

U.S. PATENT DOCUMENTS 2,362,992  11/1944  Dentzler .............................. 15/437

Primary Examiner—Stafford D. Schreyer
Attorney, Agent, or Firm—Joseph S. Iandiorio; Douglas E. Denninger

[57] ABSTRACT

Digitizer pen caddy configured to rest upon a digitizer pad for inputting data into a computer by sensing pressure applied to selected areas of the pad by the digitzer pen, the caddy including a light transmissive resilient base member, and a digitizer pen gripping grommet within the resilient base member, the resiliency of the base member being high enough to permit sufficient displacemt of the pen toward the digitizer pad when the base member is pressed by the hand of an operator. The displacement however, is limited to protect the digitizer pad from damage.

9 Claims, 1 Drawing Sheet

DIGITIZER PEN CADDY

FIELD OF THE INVENTION

This invention relates to the field of information handling and more particularly to devices for inputting data into computers.

BACKGROUND OF THE INVENTION

Digital data representative of X-Y point coordinates and lines are often inputted into microcomputers through the use of digitizer pads and digitizer pens. The digitizer pads are pressure sensitive, so that X-Y data is inputted into the computer as a function of the position upon the surface of the pad which receives pressure from the pen. For example, if the operator is inputting data indicative of a straight line starting from X-1, Y-1 and terminating at X-2, Y-2, the operator points with a pen at a point upon the surface of the digitizer pad corresponding to X-1, Y-1, and presses down upon this point, with the digitizer pen, and thereafter repeats the process with respect to X-2, Y-2. The computer may be programmed so that upon the receipt of the second signal produced by the application of the pen point to the X-2, Y-2 position, a straight line is created between the two points, and displayed on the CRT screen. Thus, as is known in the art, the matrix cross points of a pressure sensitive digitizer pad, correspond to the XY positions of an electronic screen readout.

However, there is a tendency for the operator to press down too hard upon the surface of the digitizer pad or tablet which can break the pen, but more importantly, can damage the digitizer pad. These pads are expensive and cost up to $1200. each. Also, if the operator is to draw a second line commencing at the second X-2, Y-2 point mentioned above, the operator can become distracted and have to relocate the exact position of the X-2, Y-2 coordinate in order to properly initiate the creation of the second line.

SUMMARY OF PREFERRED EMBODIMENTS OF THE INVENTION

It is thus an object of this invention to provide a simple, inexpensive and convenient method and means for preventing damage to the digitizer pen or the digitizer pad.

It is a further object of this invention to provide a digitizer pen caddy for facilitating easy and rapid connections between one line segment and the next, regardless of whether the operator becomes distracted.

It is a further object of the invention to provide a simple device for storing the digitizer pen to prevent it from rolling off of the table, and additionally to enable storage of other cylindrical objects such as ordinary pen and pencils.

The invention features a digitizer pen caddy configured to rest upon a digitizer pad and having a light transmissive resilient base member including a pen supporting device formed within the resilient base member to support the digitizer pen. A preferred support device comprises a resilient grommet, fitted within a first orifice formed within the base member. The operator first positions the caddy in the neighborhood of the desired X-Y point to be inputted into the computer, positions the pen point over the desired X-Y point on the pad by viewing through the transparent base member, and then presses down upon the resilient light transmissive base member to cause the point of the digitizer pen to actuate the appropriate X-Y switch beneath the surface of the digitizer pad. The caddy is thereafter moved so that the tip of the digitizer pen is directly over the second X-Y point on the digitizer pad to be inputted to the computer, and the process is repeated.

In accordance with a preferred embodiment, an upper portion of the caddy is also provided, including a second pen receiving orifice having a greater diameter than the inside diameter of the grommet, to enable the caddy to support and contain cylindrical objects other than the digitizer pen. An elongated trench may be formed within a forward foot portion of the caddy to receive terminal portions of such cylindrical objects, other than the digitizer pen.

Other objects, features and advantages of my invention will become apparent upon study of the following specific description taken in conjunction with the FIGURE which illustrates the caddy positioned upon a digitizer pad, together with a digitizer pen supported therein.

SPECIFIC DESCRIPTION

Digitizer pad 1 is connected to computer 2, via cable 3 in the conventional manner. For certain applications the pen could also be electrically coupled to computer 2, but this has no bearing on the instant invention. The caddy 4 is positioned upon the upper surface of pad 1, and has a resilient base member 6 having a first orifice means 7 for receiving the digitizer pen 14, such orifice means further comprising a resilient ring member 8, which could consist of a rubber grommet for example. Foot portion 9 forms an elongated trench, and an upper, or superstructure caddy portion 12, has a second orifice 13 formed therein, substantially aligned with the first orfice 7 as illustrated.

Digitizer pen 14, is passed through upper orfice 13, and through grommet 8 which grips the pen, the point 17 of which is positioned adjacent the upper portion of pad 1 as shown. The inside diameter of the resilient ring member or grommet 8 is slightly smaller than the diameter of the pen, in order to provide a snug fit, and prevent displacement of the pen with respect to the resilient base member or plate 6.

The operator positions the light transmissive caddy, which preferably comprises a unitary piece of transparent plastic, at the appropriate position upon the upper surface of pad 1, so that the point 17 of the digitizer pen is directly above the desired X-Y coordinate position to be inputted into computer 2. This is easily performed in view of the transparency of the resilient base 6. The operator thereafter presses downwardly upon the resilient base 6 in a direction represented by arrow 21, to cause the tip of the digitizer pen to lightly contact the pad to input data into computer 2, indicative of the first coordinate position to be entered. Upon the release of pressure from the resilient base, the caddy springs back to its normal position whereby a small gap is again present between the tip of the digitizer pen and the digitizer pad. The operator thereafter moves the caddy to the next appropriate position to input the second X-Y coordinate point.

The diameter of the upper orfice 13 may be, if desired, larger than the grommet diameter to accommodate any slanting object such as an ordinary pen or pencil.

After the second X-Y data point is transmitted by actuating the caddy, the caddy would normally remain in position until the operator desires to proceed in drawing a second line segment, which often is initiated at the end of the first line segment as mentioned above. Thus, even if the operator becomes distracted, the caddy maintains the point of the digitizer pen at the terminal portion of the first line drawn, so that the operator need not reestablish the proper position of the digitizer pen, as would be the case where the pen is placed upon the surface of the table without support, or otherwise removed from the vicinity of the coordinate point of the terminal first line portion. This aspect of the invention tends to speed up the process of inputting line data into the computer and makes the job of the operator easier.

A key feature of the invention is to provide a resilient base member for gripping the digitizer pen, whereby it's resiliency is high enough to permit substantial but appropriately limited displacement of the pen tip toward the pad, when the base member is pressed by the hand of the operator. However, since it will take greater and greater amounts of force to maintain further displacement of the pen tip, the operator will simply not assert such excessive force, which could produce damage within the pad. Even if this unlikely event should occur, the fit of the grommet gripping the pen could provide slippage of the pen, so that it is not permitted to dig into the digitizer pad regardless of how heavily the operator presses down at point 21 upon the surface of the resilient base. Thus it should be appreciated, that the caddy of the present invention greatly eases the task of the operator, is simple and inexpensive to manufacture, and has a built in safeguard against the assertion of too much pressure of the digitizer pen upon the digitizer pad. Accordingly, expensive digitizer pads will no longer be damaged by carelessness of the operator in pressing down too heavily upon the pad.

In accordance with another feature of the invention, ordinary pencils and the like may be stored within the caddy, and conveniently, the terminal portions of such pens or pencils may rest within the lower foot portion 9 of the caddy. It may be that the operator, for a substantial time period, does not utilize the digitizer pen; yet the caddy is useful for storing pens or pencils. This function is further facilitated, if desired, by making the second upper orfice means 13 somewhat larger than the first orfice means formed within the resilient base for snuggly gripping the digitizer pen with the grommet therein.

My invention was reduced to practise by constructing a one piece caddy of polymethyl methanelate of six mils thickness.

Many variations in the above described embodiments may be made within the scope of my invention, and thus the invention is to be limited only by the reasonable interpretation of the language of the following claims and art recognized equivalents thereof. For example, the upper caddy portion could be eliminated, so that the digitizer pen is solely supported by the first orfice means containing the grommet within resilient base 6. Although less preferred, the requisite resiliency could be provided by the pen gripping device rather than the base plate, both of these components making up the pen support structure, with or without the upper superstructure. For example, a flexible diaphram-collar could be fitted within a rigid base plate, also coupled to the pen. Should a nonelectrical pen be utilized to actuate the digitizer pad, the pen could merely be a pointed member rigidly affixed to a resilient caddy portion rather than a separate device.

I claim:

1. A digitizer pen caddy configured to rest upon a digitizer pad for inputting data into a computer by sensing pressure applied to selected areas of said pad by said digitizer pen, said caddy including a light transmissive resilient base member, and a digitizer pen receiving means formed upon said resilient base member, the resiliency of said base member being high enough to permit sufficient displacement of said pen receiving means toward said digitizer pad when said resilient base member is pressed by the hand of the operator, to readily enable a digitizer pen therein to input said data into said computer, and further including a superstructure positioned above said member having an orifice formed therein to enable said caddy to support and contain cylindrical objects other than said digitizer pen.

2. A digitizer pen caddy configured to rest upon a digitizer pad for inputting data into a computer by sensing pressure applied to selected areas of said pad by said digitizer pen, said caddy including a lower portion having a light transmissive resilient base member; a first digitizer pen receiving gripping means formed within said resilient base member, and an upper portion including a digitizer pen receiving orfice means, the resiliency of said base member being high enough to permit sufficient displacement of said gripping means toward said digitizer pad when said resilient base member is pressed by the hand of an operator, to readily enable a digitizer pen therein to input said data into said computer, said gripping means includes a gripping member for gripping said pen to a sufficient extent to prevent said pen from slipping in a direction parallel to the longitudinal axis thereof, upon the application of pressure to said resilient base member.

3. The caddy of claim 2 wherein said gripping member comprises a resilient ring member having an inside diameter slightly smaller than said digitizer pen, to provide for a snug fit of said digitizer pen therein.

4. The caddy of claim 3 wherein said pen receiving orfice means has a greater diameter than the inside diameter of said resilient ring member, to enable the caddy to support and contain cylindrical objects other than said digitizer pen.

5. A digitizer pen caddy configured to rest upon a digitizer pad for inputting data into a computer by sensing pressure applied to selected areas of said pad, said caddy comprising a digitizer pen support means having a light transmissive resilient base member, the resiliency thereof being high enough to permit sufficient displacement of said pen toward said digitizer pad upon the application of moderate manual pressure thereto, to readily enable a digitizer pen positioned thereon to input said data into said computer, and a superstructure positioned above said base member having an orifice formed therein to enable said caddy to support and contain cylindrical objects other than said digitizer pen.

6. A method of actuating a digitizing pad for inputting coordinate data into a computer comprising the steps of:
   (a) providing a resilient transparent plate having a first support portion and a second support portion widely separated from said first support portion for suspending said plate between said first and said second support portions in the manner of a beam, said transparent plate having means for coupling a pointed instrument thereto;
   (b) positioning said transparent plate over a selected area of said digitizer; and (c) manually pressing downwardly upon an upper portion of said resilient transparent plate to cause limited downward displacement of said pointed instrument, thereby to assert limited pressure upon said selected area of said digitizer pad.

7. The method of claim 6 wherein an orifice is formed within said transparent plate and a resilient grommet is positioned within said orifice for gripping said instrument.

8. A method of actuating a digitizing pad for inputting coordinate data into a computer comprising the steps of:
   (a) providng a resilient transparent plate, together with means for supporting said plate, said transparent plate having means for coupling a pointed instrument thereto;
   (b) positioning said transparent plate over a selected area of said digitizer; and
   (c) manually pressing downwardly upon an upper portion of said resilient transparent plate to cause limited downward displacement of said pointed instrument, thereby to assert limited pressure upon said selected area of said digitizer pad.

9. The method of claim 8 wherein an orifice is formed within said transparent plate and a resilient grommet is positioned within said orifice for gripping said instrument.

* * * * *